United States Patent [19]
Renlund et al.

[11] Patent Number: 5,385,874
[45] Date of Patent: Jan. 31, 1995

[54] CERAMIC COMPOSITIONS

[75] Inventors: Gary M. Renlund; Mustafa A. Syammach, both of Salt Lake City, Utah

[73] Assignee: Triox Technologies, Inc., Murray, Utah

[21] Appl. No.: 112,595

[22] Filed: Aug. 26, 1993

Related U.S. Application Data

[63] Continuation-in-part of Ser. No. 843,463, Feb. 28, 1992, Pat. No. 5,302,258.

[51] Int. Cl.⁶ .................... C04B 35/48; C04B 35/50
[52] U.S. Cl. ........................ 501/103; 501/104
[58] Field of Search ........................ 501/103, 104

[56] References Cited

U.S. PATENT DOCUMENTS

| | | | |
|---|---|---|---|
| Re. 28,792 | 4/1976 | Ruka et al. | 204/1 T |
| 3,400,054 | 9/1968 | Ruka et al. | 204/1 |
| 3,640,887 | 2/1972 | Anderson | 252/301.1 |
| 3,887,387 | 6/1975 | Sturhahn | 106/57 |
| 3,914,169 | 10/1975 | Horowitz | 204/195 S |
| 4,151,060 | 4/1979 | Isenberg | 204/195 S |
| 4,205,051 | 5/1980 | Takahashi et al. | 423/266 |
| 4,264,424 | 4/1981 | Niedrach | 204/195 S |
| 4,475,994 | 10/1984 | Gagne et al. | 204/129 |
| 4,477,541 | 10/1984 | Fraioli | 429/33 |
| 4,547,277 | 10/1985 | Lawless | 204/252 |
| 4,547,281 | 10/1985 | Wang et al. | 204/424 |
| 4,599,157 | 7/1986 | Suzuki et al. | 204/192 SP |
| 4,659,435 | 4/1987 | Brothers et al. | 204/1 T |
| 4,725,346 | 2/1988 | Joshi | 204/242 |
| 4,728,584 | 3/1988 | Isenberg | 429/31 |
| 4,851,103 | 7/1989 | Usami et al. | 204/406 |
| 4,879,016 | 11/1989 | Joshi | 204/242 |
| 4,885,142 | 12/1989 | Suitor et al. | 423/219 |
| 4,931,214 | 6/1990 | Worrell et al. | 501/104 X |
| 4,961,835 | 10/1990 | Kobayashi et al. | 204/427 |
| 4,977,114 | 12/1990 | Horinouchi et al. | 501/104 |
| 5,006,494 | 4/1991 | Virkar | 501/152 |
| 5,007,992 | 4/1991 | Weber | 204/59 R |
| 5,017,532 | 5/1991 | Sonnenberg et al. | 501/103 |
| 5,021,137 | 6/1991 | Joshi et al. | 204/242 |
| 5,022,975 | 6/1991 | Gordon | 204/277 |
| 5,037,525 | 8/1991 | Badwal | 204/421 |
| 5,045,169 | 9/1991 | Feduska et al. | 204/258 |
| 5,160,713 | 11/1992 | Mazanec et al. | 423/210 |
| 5,171,645 | 12/1992 | Khandkar | 501/104 X |
| 5,183,801 | 2/1993 | Virkar et al. | 501/152 |
| 5,186,806 | 2/1993 | Clark et al. | 204/265 |
| 5,205,990 | 4/1993 | Lawless | 422/121 |
| 5,290,332 | 3/1994 | Chatterjee et al. | 501/103 X |

OTHER PUBLICATIONS

"Oxygen Production Using Solid–State Zirconia Electrolyte Technology"; Jerry W. Suitor and Douglas J. Clark; Jet Propulsion Laboratory, California Institute of Technology, Pasadena, Calif.; Sep. 1990 or thereafter; pp. 127 through 132.

"Dense–Ceramic Oxygen Conducting Membranes"; GRI-90/0303; Apr. 1989 through Sep. 1990; pp. 33 through 35; four pages of references.

"Lattice Parameters, Ionic Conductivities, and Solubility Limits in Fluorite-Structure $MO_2$ Oxide(M=$Hf^{4+}$, $Zr^{4+}$, $Ce^{4+}$, $Th^{4+}$, $U^{4+}$ Solid Solutions"; Dae–Joon Kim; *Journal of American Ceramic Society*, vol. 72, No. 8, pp. 1415 through 1421, Aug. 1989.

"A Model to Predict The Removal Of Oxygen From Air Using A Zirconia Solid Electrolyte Membrane"; W. J. Marner, J. W. Suitor, and C. R. Glazer; *Proceedings of the 23rd Intersociety Energy Conversion Conference*; vol. 2, ASME, New York, 1988; pp. 265 through 271.

"The Zirconia Oxygen Separation Process"; Jet Propulsion Laboratory, Pasadena, Calif.; May 1987; pp. 2-1 through 2-5.

"Solid Electro lytes With Oxygen Ion Conduction"; E. C. Subbarao and H. S. Maiti; *Solid State Ionics*; 1984; vol. 11; pp. 317 through 338.

"Revised Effective Ionic Radii and Systematic Studies of Interatomic Distances in Halides and Chalcogenides"; R. D. Shannon; *Acta Cryst.*, 751–767 (1976).

Primary Examiner—Donald R. Valentine
Attorney, Agent, or Firm—& Metcalf Madson

[57] ABSTRACT

A solid composition provides high oxygen ion conductivity, and includes a metal oxide combined with multiple dopants. The oxide may, for example, include zirconia, bismuth trioxide, thoria or hafnia. The dopants are chosen such that they are of similar ionic radius to the oxide, but such that they generally have different valences. For example, zirconium has a +4 valence, while dopants are usually chosen which have +2 or +3 valences. Possible dopants include materials such as magnesia, yttria, and oxides of calcium, barium, strontium, lanthanum, ytterbium, and scandium. It has been found that choosing the dopants such that they exist in the composition at specified ratios results in surprising ability to transport oxygen ions. In the case of a composition which includes magnesia and yttria dopants placed within a zirconia matrix, it has been found desirable to maintain the ratio of the mole percentages of the magnesia to the yttria in the range of from about 5.75:10 to about 11:10. Also disclosed are methods and apparatus for using the composition in removing oxygen and water from a mixture of gases. Such a process is valuable in the isolation and purification of both oxygen and the other gases in the mixture.

23 Claims, 2 Drawing Sheets

CERAMIC COMPOSITIONS

This application is a continuation-in-part of copending application Ser. No. 07/843,463 filed Feb. 28, 1992, now U.S. Pat. No. 5,302,258 and entitled "Compositions, Methods, and Apparatus For Separating Oxygen From A Gaseous Mixture."

BACKGROUND

1. The Field of the Invention

The present invention is related to ceramics which possess particularly high oxygen ion conductivity. More particularly, the present invention is related to a doped ceramics and methods and apparatus for their use in removing oxygen and water from a gaseous mixture of oxygen, water and other relatively inert gases.

2. Technical Background

In a number of applications it is important to remove oxygen from a mixture of gases. For example, even in purified gases, it is known that trace quantities of oxygen remain within the gas. In order to provide a very pure gas, it would be desirable to remove as much of the trace oxygen as possible. Examples of such gases include nitrogen and noble gases.

Small quantities of oxygen mixed within otherwise pure inert gases have proven problematic in a number of contexts. For example, in the manufacture of semiconductor devices, it is important to provide an essentially oxygen-free environment during certain types of processing steps. A typical solution for the problem is to flush the processing environment with an inert gas. However, even when inert gas fills the processing environment, trace amounts of oxygen still exist and are mixed with the inert gases.

Various processes have been attempted to remove oxygen from such inert gases. For example, it has been conventional to filter the gas in order to attempt to remove oxygen. Various filtering and removal processes have been employed, including adsorption, absorption, catalytic reactions, and membrane separation. Even using these processes, however, gases of less than ideal purity have been produced. Furthermore, such processes are cumbersome and difficult to use in large scale operations.

A reverse of the problem described above is involved in the production of commercial quantities of extremely pure oxygen. Problems similar to those described concerning other gases are also encountered in the production of pure oxygen. In all existing processes, it would be desirable to provide oxygen of better quality using a simple and relatively inexpensive process.

While not commonly used in gas purification, electrochemical devices which employ oxygen ion conducting electrolytes are known to exist. These electrolytes are widely used as oxygen sensors. Such sensors have received wide acceptance in devices such as automobile engines and furnaces where it is critical to maintain the ratio of fuel and oxygen within particular acceptable ranges. Some devices of this nature have also been employed for the purposes of preparing pure oxygen.

The mechanism of oxygen ion conduction is well known. Indeed, ionic conductivity of certain materials was studied by Nernst as early as the 1890's. Nernst found that if there was a difference in oxygen concentration across a dense zirconia membrane, an electrical potential could be measured from electrodes placed on opposite sides of the zirconia. Nernst showed that the following equation relates the applied voltage to the difference in oxygen concentration:

$$E = (RT/ZF) \ln(p2/p1)$$

where: E = electrical potential (volts)
R = gas constant
T = temperature
Z = charge
F = faraday constant
p1 = partial pressure oxygen on one side
p2 = partial pressure oxygen on the opposite side Nernst also found that if a potential is applied across the membrane, oxygen ions can be transported from one side of the membrane to the other. The general mechanism of oxygen ion conductivity is believed to be as follows:

$$O_2 + 4e^{31} \rightarrow 2O^- 2O^- O_2 \rightarrow + 4e^-$$

It has been discovered, however, that conventional ceramics, such as zirconia, are inefficient at conducting oxygen ions. Pure zirconia, for example, is not generally incorporated into commercial gas purification devices. In addition zirconia is known to be difficult to handle. This is the case because pure zirconia ceramic experiences a phase transition from a monoclinic to a tetragonal structure at about 1170° C. This results in a large change in volume, which in turn causes stress and cracking in dense ceramic parts.

In order to avoid some of the problems encountered with pure zirconia ceramics, it is conventional to add a dopant to the ceramic. Dopants are found to stabilize the tetragonal zirconia crystal structure. When zirconia is doped to higher levels, the structure can be stabilized in the a cubic phase. These materials are much easier to handle than pure zirconia. Yet, while certain of these materials are found to be conductive to oxygen ions, their conductivity is less than ideal for purposes of gas processing.

Accordingly, it would be a significant advancement in the art to provide materials which are highly conductive to oxygen ions. More particularly, it would be an advancement to provide materials which were highly conductive to oxygen ions and which is relatively easy to handle and easy to incorporate into a gas processing device. It would be a related advancement to provide an apparatus, using such a material, which is capable of separating oxygen from a gaseous mixture. It would also be an advancement in the art to provide highly effective methods for separating oxygen from a gaseous mixture.

Such compositions, methods and apparatus are disclosed and claimed herein.

BRIEF SUMMARY AND OBJECTS OF THE INVENTION

The present invention relates to solid compositions which have extremely high levels of oxygen ion conductivity. The compositions are generally doped metal oxide ceramics. The compositions are based upon metal oxides which form the bulk of the composition. In a typical embodiment of the invention, the metal oxide may comprise from about 75% to about 90% of the overall composition. Typical oxides used to form the basis of the compositions may include zirconia, ceria, bismuth oxide ($Bi_2O_3$), thoria, hafnia, and similar materials known in the ceramics art.

The oxide is then doped with multiple dopants. The dopants are of the type known in the art and commonly used to form ceramic materials. Such dopants may include materials such as magnesia, yttria, and oxides of calcium, barium, strontium, lanthanum, ytterbium, and scandium.

In one important aspect of the invention, the dopants are specifically chosen and matched with the other materials in the composition. In particular, it is preferred that the dopants be of similar ionic radius to the metal oxide, but that they generally have different valences. For example, zirconium has a +4 valence. Dopants in a zirconia based ceramic will generally be chosen which have +2 or +3 valences. For example, in one preferred embodiment of the present invention zirconia is doped with yttria and magnesia. It is preferred that the ionic radius of the ceramic oxide be within a factor 0.75 of the ionic radius of the dopants.

It has been found that choosing the dopants such that they are incorporated into the composition at specified ratios results in surprising levels of oxygen ion conductivity. For example, in the case of a composition which includes magnesia and yttria dopants placed within a zirconia matrix, it has been found desirable to maintain the ratio of the mole percentages of the magnesia to the yttria in the range of from about 5.75:10 to about 11:10. In a typical exemplary composition within the scope of the invention, total mole percentages of dopants include 7.0 mole percent yttria, 5.61 mole percent magnesia, with zirconia comprising the remainder.

The present invention also relates to methods and apparatus for using such compositions in removing oxygen and moisture from a mixture of gases. Such processes and apparatus are valuable in the isolation and purification of both oxygen and the other gases in the mixture. In particular, gases such as noble gases and nitrogen, which typically also contain trace quantities of oxygen or water, can be purified. The oxygen removed from such a gaseous mixture also has significant value.

The preferred apparatus of the present invention typically includes a hollow cylinder constructed of the ceramic material described above. It should be understood, however, that the teachings contained herein could also be used for a planar sheet or a honeycomb configuration. As mentioned above, the cylinder will generally comprise a solid electrolyte formed of a ceramic metal oxide and at least two different dopants. The dopants will generally be incorporated into the ceramic such that the ratio of the mole percentages of the first dopant to the second dopant is in the range of from about 5.75:10 to about 11:10. However, if the nature of the dopants changes, the exact ratios will change as well. Indeed, for certain dopants the ratios may be outside of the stated ranges, but the ratios may be calculated by methods known in the art.

In order to create an electrical potential through the ceramic electrolyte it is necessary to coat the cylinder with conducting materials which are capable of receiving leads from a power source. It is typical to coat both the inside and the outside of the cylinder with a metal in order to enable the creation of such an electrical potential. Metals typically used in the coatings (electrodes) include silver, platinum, and palladium. A typical device may have a platinum electrode coating on the inside and a silver electrode coating on the outside.

Disposed between the metal coating and the electrolyte may be a layer of strontium-doped lanthanum manganate (LSM) or similar material. The specific composition of the LSM is selected to match the thermal expansion of the electrolyte. LSM provides a good adherent layer between the electrolyte and the electrodes. In addition, it is appears that the LSM catalyzes the reaction of oxygen atoms into oxygen ions and is also electrically conductive.

As mentioned above, a preferred apparatus for oxygen removal involves means for creating an electrical potential between the inside and outside of the cylinder. This generally includes a source of direct current, with its negative terminal in communication with the outside of the cylinder and the positive terminal in communication with the inside of the cylinder. Electrical connection is established by attachment to the metal electrodes described above. This configuration moves oxygen from inside the tube to outside the tube. Hence, oxygen is removed from an inert gas within the tube.

A reciprocal configuration can result in moving oxygen from outside the tube into the tube. In this manner, oxygen can be removed from an inert gas outside the tube and can result in significant oxygen generation.

It is clear that to remove oxygen from a gaseous mixture within the tube it is necessary to provide means for placing said gaseous mixture in contact with the electrolyte such that oxygen contained within the gaseous mixture can be ionized and then pass through the electrolyte. This leaves the remainder of the gaseous mixture inside the cylinder. In that regard, a source of gas is simply attached to one end (proximal end) of the cylinder and purified gas is then collected at the opposite end (distal end) of the cylinder.

The invention also provides means for heating the electrolyte to the required temperatures, while isolating the heated area from the remainder of the device. This is achieved by providing an insulated enclosure about the electrolyte. Inside the enclosure are heating elements and controls necessary to heat the interior of the enclosure to the range of from about 650° C. to about 1000° C. It is found that oxygen removal is optimized within this temperature range. Further, it is found that preheating the gas mixture so that it reaches the above range of temperatures within the tube optimizes oxygen removal.

A second enclosure is provided to cover the entire device and bellows are provided between the interior and exterior enclosures. Bellows may be attached to both ends of the cylinder such that a gas tight fitting is achieved. The bellows and the second enclosure provide a cold seal in that they are generally isolated from the heated portion of the device by the interior enclosure. This is a significant benefit of the invention.

Finally, the electrolyte and related assembly are gently held in place in order to avoid damage and breakage. This is achieved by the use of bulkhead fittings or similar mechanisms. These fittings are configured such that they support the electrolyte cylinder and related structure. They also allow for the suspension of multiple electrolytes in the same enclosure.

It will be appreciated that the present invention may be used to either collect purified oxygen, or to remove oxygen and water from a mixture of gases. It is possible, for example, to remove oxygen which exists in the percent or parts per million range from nitrogen or a noble gas. In order to undertake this process it is only necessary to create an electrical potential between the inside of the cylinder and the outside by use of the direct current power source, at the same time the interior enclosure is heated to the desired temperature. Then the subject mixture of gases is passed through the cylinder. Because the electrolyte conducts oxygen ions, oxygen is converted to ions, passes through the walls of the electrolyte and is then recombined. This results in removal of the oxygen from the gas stream. During this process the other inert gases remain on the inside of the electrolyte cylinder.

Thus, the present invention provides novel compositions, apparatus, and methods for separating oxygen and water from a gaseous mixture. This is achieved by the use of the novel ceramics described above, which possess particularly high oxygen ion conductivity.

Accordingly, it is a primary object of the present invention to provide materials which are highly conductive to oxygen ions.

More particularly, it is an object of the present invention to provide materials which are highly conductive to oxygen ions and which are relatively easy to handle and to incorporate into gas processing devices.

It is a related object of the invention to provide an apparatus, using such materials, which is capable of separating oxygen with a gaseous mixture.

It is also an object of the invention to provide highly effective methods for separating oxygen from a gaseous mixture.

These and other objects and advantages of the invention will become apparent upon reading the following detailed description and appended claims, and upon reference to the accompanying drawings.

BRIEF DESCRIPTION OF THE DRAWINGS

In order that the manner in which the above-recited and other advantages and objects of the invention are obtained, a more particular description of the invention briefly described above will be rendered by reference to specific embodiments which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

As described above, the present invention relates to the formulation and use of ceramics which display surprising levels of oxygen ion conductivity. At the same time, the compositions of the present invention avoid the problems encountered with conventional ceramics, including cracking and brittleness of pure ceramic materials. In particular, the compositions of the present invention are formulated such that there exist "point defects" in the crystal lattice. The defects are specifically selected and formed in order to allow maximum oxygen ion conductivity.

The basic materials used in the formulation of the ceramic material of the present invention are ceramic oxides. Typical basic materials include zirconia ($ZrO_2$), ceria ($CeO_2$), bismuth oxide ($Bi_2O_3$), thoria ($ThO_2$), and hafnia ($HfO_2$). As mentioned above, zirconia is a good conductor of oxygen ions, as are the other listed materials.

It is found that some of the materials which are alternatives to zirconia, such as ceria and bismuth oxide, are efficient at creating conduction of oxygen through the electrolyte. These benefits are somewhat offset, however, with limitations such as lower strength than zirconia, and increased susceptibility to chemical reaction under conditions of low oxygen partial pressure and high voltage and temperature.

Ionic conduction is increased in the present invention by doping the primary material with multiple dopants. Typical dopants include yttria ($Y_2O_3$) and magnesia (MgO), as well as the oxides of calcium, barium, strontium, lanthanum, ytterbium, and scandium, and like elements. It is believed that dopants increase oxygen conductivity by introducing "defects" within the crystal lattice which allow the passage of oxygen ions.

The present invention teaches optimal oxygen ion conductivity by careful selection of the dopants and the resulting lattice defects. In particular, it is preferred to select dopants which display ionic radii very near that of the primary material (such as zirconia or ceria). At the same time, it is desirable to chose dopants based on metals which have a different valence than the primary material. That is, in a composition based on zirconium, which has a $+4$ valence, dopants having $+2$ and $+3$ valences are presently preferred. This provides defects in the crystal lattice which allow the passage of ionic oxygen.

In addition, it is important to balance the size of the first and second dopants added. It is preferred that the ionic radius of the ceramic oxide be within a factor 0.75 of the ionic radius of the dopants. For example, the addition of yttria to a zirconia lattice provides a particular set of lattice distortions. By then adding magnesia, the crystal lattice is allowed to return to a more stable state. In this manner, the selection of multiple dopants provides the general benefits of added dopants, but minimizes the limitations otherwise experienced with the use of dopants.

In a representative embodiment, yttria and magnesia are added to zirconia. Typically from about 2.5% to about 40% yttria is added. It is found that when between about 2.5% to about 6% yttria is added a tetragonal crystal lattice is formed. When more than about 6% yttria is added, a cubic crystal lattice is observed. In most embodiments of the present invention, the cubic lattice is preferred in that the cubic form readily allows for the transport of oxygen ions through defects resulting from the addition of the yttria dopant.

Magnesia is then added to the composition. Magnesia provides additional defects in the crystal lattice, but also results in a general balancing of the size of the defects. This results in a marked increase in the conductivity of oxygen ions. The ratio of mole percentages of magnesia to yttria is preferred to be in the range of from about 6.5:10 to about 9.5:10. One preferred composition comprises about 5.61 mole percent magnesia, 7.00 mole percent yttria, and the remainder zirconia. A preferred alternative composition comprises about 5.23 mole percent yttria, about 6.77 mole percent calcium oxide (calcia), and the remainder ceria.

As mentioned above, the total mole percent dopants in the composition will typically be in the range of from about 6% to about 25% of the total ceramic composition. The remainder of the composition will be the ceramic matrix material, such as zirconia or ceria.

In zirconia doped with a single dopant, typical oxygen ion resistivity is in the range of about 100 ohm-centimeters. Using the present invention conversely, oxygen ion resistivity is observed in the range of about 32–45 ohm-centimeter. Thus, it will be appreciated that the present invention provides significantly increased capability to conduct oxygen ions.

As mentioned above, the present invention also relates to apparatus and methods for processing gaseous mixtures by employing the compositions of the present invention. In that regard the present invention can be best understood by reference to the drawings where like parts are designated with like numerals throughout.

Figure 1:
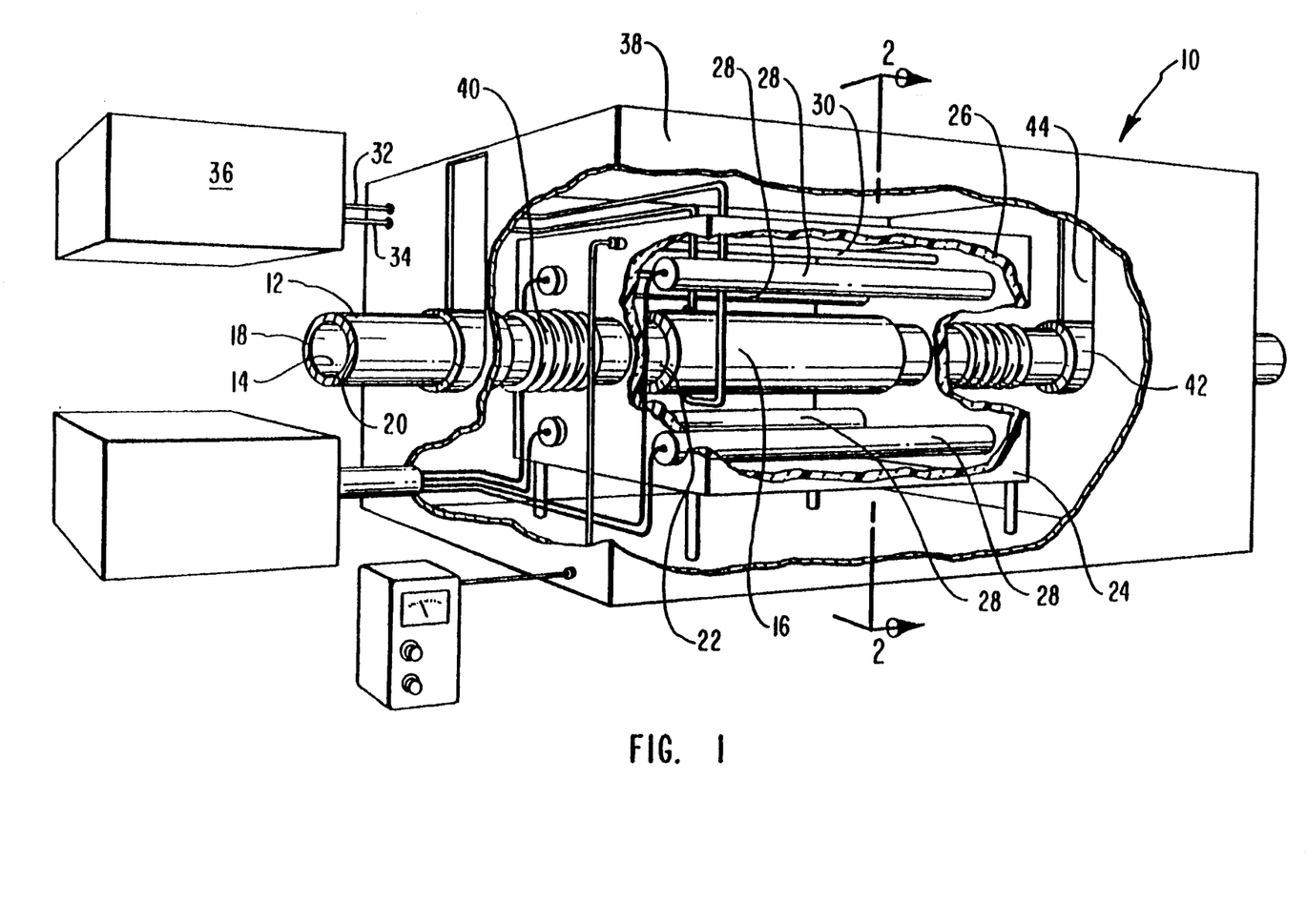
FIG. 1 is a partially cut away perspective view of one embodiment of the device of the present invention.

Reference is first made to FIG. 1 in which one embodiment of the apparatus of the present invention is illustrated and designated 10. FIG. 1 is a partially cut away perspective view of a gas processing device within the scope of the present invention. The basic functional feature of the device is the hollow cylinder or tube 12.

As illustrated in FIG. 1, the cylinder 12 may run the length of the device 10. The cylinder 12 is formed of the ceramic composition of the present invention. As mentioned above, the ceramic comprises a ceramic metal oxide which is doped with multiple dopants.

The ceramic structure forms an electrolyte 18. The electrolyte 18 is then coated in order to provide conductive surfaces, or electrodes 14 and 16, on the inside and the outside of the cylinder respectively. The electrode materials may be any acceptable electrically conductive material. Such materials which fall within the scope of the present invention include silver, platinum, and palladium. The material on the inside of the cylinder may be the same or different from the material on the outside of the cylinder. In one preferred embodiment, the material on the outside of the cylinder is silver, whereas the material on the inside of the cylinder is platinum.

The preferred apparatus of the present invention typically includes a hollow cylinder constructed of the ceramic material described above. However, it should be understood that the teachings contained herein could also be used for a planar sheet or a honeycomb configuration.

It may be desirable to provide intermediate layers 20 and 22 between the electrodes and the electrolytes. Such material may include strontium-doped lanthanum manganate (LSM) or similar material. LSM is particularly acceptable because of its combination of properties. LSM provides an adhesive intermediate layer between the electrolyte 18 and the electrodes 14 and 16. At the same time, LSM is electrically conductive and is believed to catalyze the conversion of oxygen to oxygen ions. Thus, LSM may significantly increases the effectiveness of the device.

It will be appreciated that the conductivity of oxygen ions is most effective at elevated temperatures. In particular, temperatures in the range of from about 650° C. to about 1000° C. are required to provide efficient conductivity. It is presently preferred, however, to operate at temperatures in the range of from about 780° C. to about 820° C.

In order to operate the device 10 at these elevated temperatures it is necessary to isolate the high temperature area from the remainder of the device. In the illustrated embodiment, this takes the form of an enclosure 24 disposed about the electrolyte and related structures. This interior enclosure 24 also preferably includes an adequate layer of insulation 26 to isolate the remainder of the device from the elevated operating temperatures.

Placed within the interior of the enclosure 24 are the necessary components to provide an electrical potential across the electrolyte 18 and to control the temperature within the enclosure 24. Thus, a series of heating elements 28 are provided. These heating elements are available commercially and may take the form of heating coils or other conventional types of heating elements. In order to control the temperature, a temperature sensor or thermocouple 30 is also disposed within the interior of the enclosure 24 and attached to the required external power source and controls. All of these elements are powered and controlled through the use of conventional power sources and control components (not shown).

Also illustrated are wires 32 and 34 which extend into the interior enclosure 24 from the exterior of the device. Wire 32 is attached to the exterior electrode 16 and wire 34 is similarly attached to the interior electrode 18. The wires 32 and 34 are in turn connected to a direct current power source 36. In this manner, the necessary electrical potential is created across the electrolyte 18. As described above, the electrical potential is required in order to accommodate the flow of oxygen ions through the electrolyte 18.

Disposed around the interior enclosure 24 is a second exterior enclosure 38. The enclosure 38 covers and protects the essential working components of the device 10. Also illustrated between the interior enclosure 24 and the exterior enclosure 38 are a set of bellows 40. Bellows 40 act as a seal and means for compensating for thermal expansion in the device. By use of the bellows system, it is possible to maintain an essentially cold seal between the electrolyte and the enclosure 38.

FIG. 1 also illustrates one method of suspending the cylinder 12 within the device. That method involves the use of a pair of bulkhead fittings 42 configured such that they support said electrolyte cylinder 12. The bulkhead fittings 42 provide for gentle suspension of the cylinder 12 such that damage and breakage are avoided. In addition, in alternative embodiments of the device it is possible to employ bulkhead fittings 42 in order to suspend multiple cylinders 12 within the device.

Figure 2:
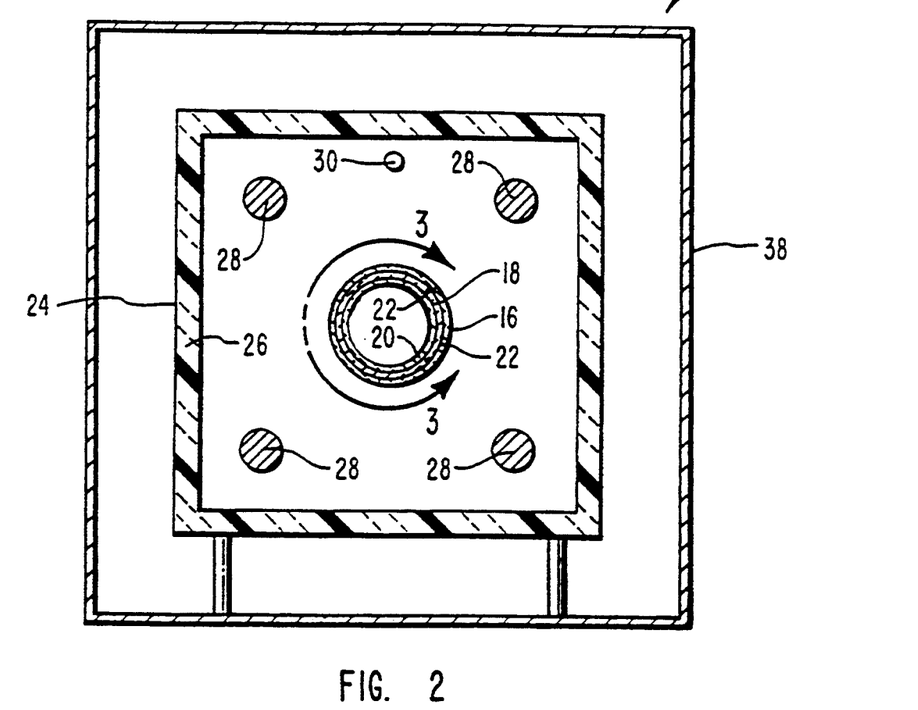
FIG. 2 is a cross section of the device illustrated in FIG. 1.

FIG. 2 is a cross sectional view of the device 10 illustrated in FIG. 1. In FIG. 2 the same components of the device 10 are illustrated, however, the spacial relationship of the components can be more fully appreciated when FIG. 2 is taken in combination with FIG. 1. In particular, the structure of the cylinder 12 is illustrated. As can be seen in FIG. 2, the basic structural feature of the cylinder is the electrolyte 18. Coated on both the inside and the outside surfaces of the electrolyte 18 are layers of LSM. As mentioned above, the LSM layers provide a number of benefits including improved electrical conductivity of the cylinder, an adhesive layer between the electrolyte and the metallic electrode layers, and a catalyst for the ionization of oxygen.

Coated onto the inside and the outside of the cylinder are metallic electrode layers. As mentioned above, these may preferably comprise silver, platinum, palladium, gold or copper.

FIG. 2 also illustrates the heating mechanism disposed within the interior enclosure 24. The heating mechanism comprises a series of four (4) heating elements 28 and a thermocouple/temperature controller 30. These components provide a simple mechanism for achieving and controlling the required operating temperatures within the device.

The structure of the two enclosures is also illustrated. The interior enclosure houses the high temperature operating region. Thus, the enclosure includes a layer of insulation 26 within the enclosure 14. As was discussed above, the exterior enclosure 38 encloses the primary operating components of the device. Thus, a compact device 10 is provided in which all of the sensitive components are protected and in which the high temperature area is isolated.

Figure 3:
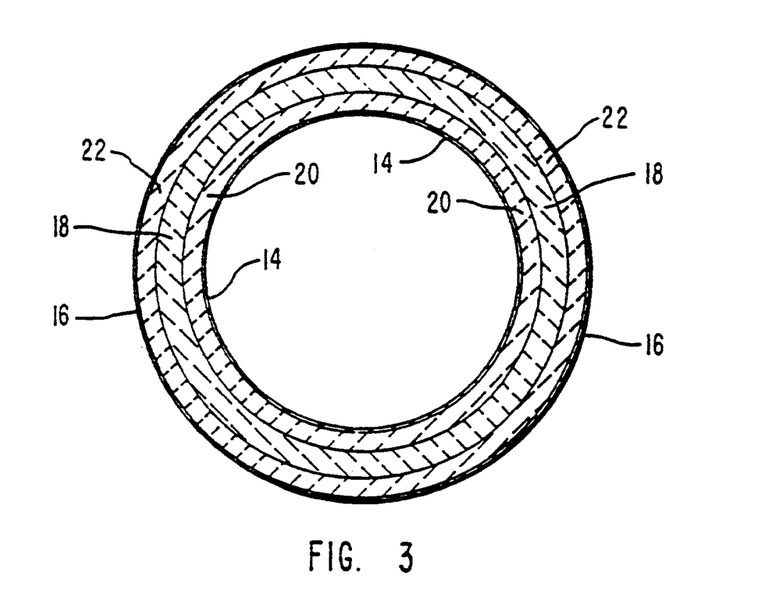
FIG. 3 is a cross section of a ceramic tube useful in the device illustrated in FIGS. 1 and 2, showing the various layers which make up the tube.

Reference is next made to FIG. 3. FIG. 3 is a cross sectional view of the cylinder 12 and illustrates the cylinder 12 in some additional detail. The structure of the cylinder 12 is as discussed in detail above. The interior layer of the cylinder comprises a metal electrode layer 14. Moving toward the exterior of the cylinder, the next layer is the LSM 20 layer described above. This layer provides an adhesive intermediate layer between the metal electrode and the ceramic electrolyte 18. The ceramic electrolyte 18 comprising the next layer moving toward the exterior. On the outside of the ceramic electrolyte is an additional LSM layer 22. Finally, an additional metallic electrode layer 16 is provided on the exterior of the cylinder.

The operation of the device is apparent from the description set forth above. Initially the cylinder 12 is connected to a source of mixed gas to be processed. In that manner, the gas is allowed to flow through the interior of the cylinder 12. At the same time an electrical potential is established between the inside and the outside of the cylinder by means of the direct current power source 36. The interior of the enclosure 24 is heated to the desired temperature range. As mentioned above, the preferred range is from about 650° C. to about 1000° C., with a more preferred range being from about 780° C. to about 820° C.

As the gas passes through the device, oxygen is conducted from the interior of the cylinder 12 to the outside of the cylinder 12, while the remainder of the gas remains within the interior of the cylinder. Thus, the gas, less the oxygen travels out of the device 10 and is collected. At the same time, the oxygen may be collected as it passes out of the device through a bleed valve 44. Thus, the present invention provides effective methods and apparatus for removing oxygen from a gaseous mixture.

Traces of water in the gas stream will also be removed. At higher operating voltages, water is dissociated into hydrogen and oxygen. The oxygen produced in this manner if transported out of the gas stream. While the hydrogen produced remains within the gas stream, it is not found to be problematic when it exists in trace quantities in otherwise pure gases.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

EXAMPLE 1

In this example a ceramic composition within the scope of the present invention was made. The composition comprised 7 mole percent yttria, 5.61 mole percent magnesia, with zirconia comprising the remainder of the composition.

Oxygen ion resistivity of the ceramic material was then measured and the data obtained is set forth as follows:

| Temperature (°C.) | Resistivity (ohm × cm) |
| --- | --- |
| 680 | 114 |
| 730 | 61 |
| 780 | 35 |
| 830 | 23 |
| 880 | 15 |

The data indicates that this composition has good oxygen ion conductivity.

EXAMPLE 2

In this example a ceramic composition within the scope of the present invention was made. The composition comprised 7 mole percent yttria, 6.6 mole percent magnesia, with zirconia comprising the remainder of the composition.

Oxygen ion resistivity of the ceramic material was then measured and the data obtained is set forth below:

| Temperature (°C.) | Resistivity (ohm × cm) |
| --- | --- |
| 680 | 305 |
| 730 | 129 |
| 780 | 63 |
| 830 | 34 |
| 880 | 20 |

The data indicates that this composition has good oxygen ion conductivity.

EXAMPLE 3

In this example a ceramic composition within the scope of the present invention was made. The composition comprised 7 mole percent yttria, 4.6 mole percent magnesia, with zirconia comprising the remainder of the composition.

Oxygen ion resistivity of the ceramic material was then measured and the data obtained is set forth below:

| Temperature (°C.) | Resistivity (ohm × cm) |
| --- | --- |
| 680 | 271 |
| 730 | 118 |
| 780 | 57 |
| 830 | 32 |
| 880 | 19 |

The data indicates that this composition has good oxygen ion conductivity.

EXAMPLE 4

In this example a ceramic composition within the scope of the present invention was made. The composition comprised 5.23 mole percent yttria, 6.77 mole percent CaO, with ceria (CeO$_2$) comprising the remainder of the composition.

Oxygen ion resistivity of the ceramic material was then measured and compared to a standard composition. The standard composition comprised 12% yttria in a ceria matrix. The data obtained is set forth below:

| Temperature (°C.) | Resistivity (ohm × cm) | |
| --- | --- | --- |
| | Standard | Composition |
| 680 | 67 | 45 |
| 730 | 42 | 29 |
| 780 | 28 | 19 |
| 830 | 19 | 13 |
| 880 | 14 | 9 |

The data indicates that this composition has good oxygen ion conductivity. The data indicates that the resistivity of the exemplary composition was lower than the standard over the temperature range measured.

SUMMARY

Accordingly, the present invention provides materials which are highly conductive to oxygen ions. The materials are observed to be both highly conductive to oxygen ions and relatively easy to handle and to incorporate into a gas processing device. The present invention also provides an apparatus, using such a material, which is capable of separating oxygen from a gaseous mixture. Finally, the present invention also provides highly effective methods for separating oxygen from a gaseous mixture.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A solid electrolyte permeable by oxygen ions comprising:
   a ceramic oxide;
   a first dopant incorporated within said ceramic oxide;
   a second dopant incorporated within said ceramic oxide;
   wherein the ratio of the mole percentages of said first dopant to said second dopant is in the range of from about 5.75:10 to about 11:10 and wherein the ionic radius of said ceramic oxide is within a factor of approximately 0.75 of the ionic radius of said dopants.

2. A solid electrolyte permeable by oxygen ions as defined in claim 1 wherein said ceramic oxide comprises zirconia.

3. A solid electrolyte permeable by oxygen ions as defined in claim 1 wherein said ceramic oxide comprises ceria.

4. A solid electrolyte permeable by oxygen ions as defined in claim 1 wherein said ceramic oxide is selected from the group consisting of Bi$_2$O$_3$, thoria, and hafnia.

5. A solid electrolyte permeable by oxygen ions as defined in claim 1 wherein said first dopant comprises magnesia.

6. A solid electrolyte permeable by oxygen ions as defined in claim 1 wherein said second dopant comprises yttria.

7. A solid electrolyte permeable by oxygen ions as defined in claim 1 wherein said first dopant is selected from the group consisting of the oxides of calcium, barium, strontium, lanthanum, and ytterbium.

8. A solid electrolyte permeable by oxygen ions as defined in claim 1 wherein said second dopant is selected from the group consisting of the oxides of calcium, barium, strontium, lanthanum, and ytterbium.

9. A solid electrolyte permeable by oxygen ions as defined in claim 1 wherein said first dopant is selected from the group consisting of the oxides of calcium, barium, strontium, lanthanum, and scandium.

10. A solid electrolyte permeable by oxygen ions as defined in claim 1 wherein said second dopant is selected from the group consisting of the oxides of calcium, barium, strontium, lanthanum, and scandium.

11. A solid electrolyte permeable by oxygen ions as defined in claim 1 wherein said first and second dopants comprise from about 10 mole percent to about 25 mole percent of the solid electrolyte.

12. A solid oxygen permeable electrolyte comprising:
   a ceramic oxide comprising the oxide of a tetravalent element;
   first and second dopants incorporated within said ceramic oxide wherein said dopants comprise oxides of bi- or tri-valent elements;
   wherein the ionic radius of said ceramic oxide is within a factor of approximately 0.75 of the ionic radius of said dopants.

13. A solid oxygen permeable electrolyte as defined in claim wherein said ceramic oxide comprises zirconia.

14. A solid oxygen permeable electrolyte as defined in claim 12 wherein said ceramic oxide comprises ceria.

15. A solid oxygen permeable electrolyte as defined in claim 12 wherein said ceramic oxide is selected from the group consisting of Bi$_2$O$_3$, thoria, and hafnia.

16. A solid oxygen permeable electrolyte as defined in claim 12 wherein said first dopant comprises magnesia.

17. A solid oxygen permeable electrolyte as defined in claim 12 wherein said second dopant comprises yttria.

18. A solid oxygen permeable electrolyte as defined in claim 12 wherein said first and second dopants are selected from the group consisting of the oxides of calcium, barium, strontium, lanthanum, and ytterbium.

19. A solid oxygen permeable electrolyte as defined in claim 12 wherein said first and second dopants comprise from about 10 mole percent to about 25 mole percent of the solid electrolyte.

20. A solid electrolyte permeable by oxygen ions comprising:
   a ceramic oxide comprising the oxide of a tetravalent element;
   first and second dopants incorporated within said ceramic oxide wherein said dopants comprise oxides of bi- or tri-valent elements.
   wherein the ratio of the mole percentages of said first dopant to said second dopant is in the range of from about 5.75:10 to about 11:10, said first and second dopants comprise from about 10 mole percent to about 25 mole percent of the solid electrolyte, and wherein the ionic radius of said ceramic oxide is within a factor of approximately 0.75 of the ionic radius of said dopants.

21. A solid electrolyte permeable by oxygen ions comprising:
- a ceramic oxide wherein said ceramic oxide is selected from the group consisting of ceria, $Bi_2O_3$, thoria, and hafnia;
- a first dopant incorporated within said ceramic oxide;
- a second dopant incorporated within said ceramic oxide;
- wherein the ratio of the mole percentages of said first dopant to said second dopant is in the range of from about 5.75:10 to about 11:10.

22. A solid electrolyte permeable by oxygen ions as defined in claim 21 wherein said first dopant is selected from the group consisting of the oxides of calcium, barium, strontium, lanthanum, and ytterbium.

23. A solid electrolyte permeable by oxygen ions comprising
- a ceramic oxide selected from the group consisting of zirconia, ceria, bismuth trioxide, thoria, and hafnia;
- a first dopant incorporated within said ceramic oxide;
- a second dopant incorporated within said ceramic oxide;
- wherein the ratio of the mole percentages of said first dopant to said second dopant is in the range of from about 6.5:10 to about 9.5:10, wherein said first and second dopants are selected from the group consisting of magnesia, yttria, and the oxides of calcium, barium, strontium, lanthanum, and scandium, and wherein the ionic radius of said ceramic oxide is within a factor of approximately 0.75 of the ionic radius of said dopants.

* * * * *

UNITED STATES PATENT AND TRADEMARK OFFICE
CERTIFICATE OF CORRECTION

PATENT NO. : 5,385,874
DATED : January 31, 1995
INVENTOR(S) : Gary M. Renlund et al.

It is certified that error appears in the above-identified patent and that said Letters Patent is hereby corrected as shown below:

On the title page, under item [56]:
Name of Attorney, Agent, or Firm should read "Madson & Metcalf".

Column 2, line 19 formula should read exactly as $$O_2 + 4e^- \rightarrow 2O^- \qquad 2O^- \rightarrow O_2 + 4e^-$$

Signed and Sealed this

Twenty-seventh Day of June, 1995

Attest:

BRUCE LEHMAN

*Attesting Officer*     *Commissioner of Patents and Trademarks*